July 3, 1928.

G. VEGLIO 1,675,963

RESILIENT SUSPENSION FOR MOTOR VEHICLES

Filed July 27, 1925   3 Sheets-Sheet 1

July 3, 1928.
G. VEGLIO
1,675,963
RESILIENT SUSPENSION FOR MOTOR VEHICLES
Filed July 27, 1925   3 Sheets-Sheet 2
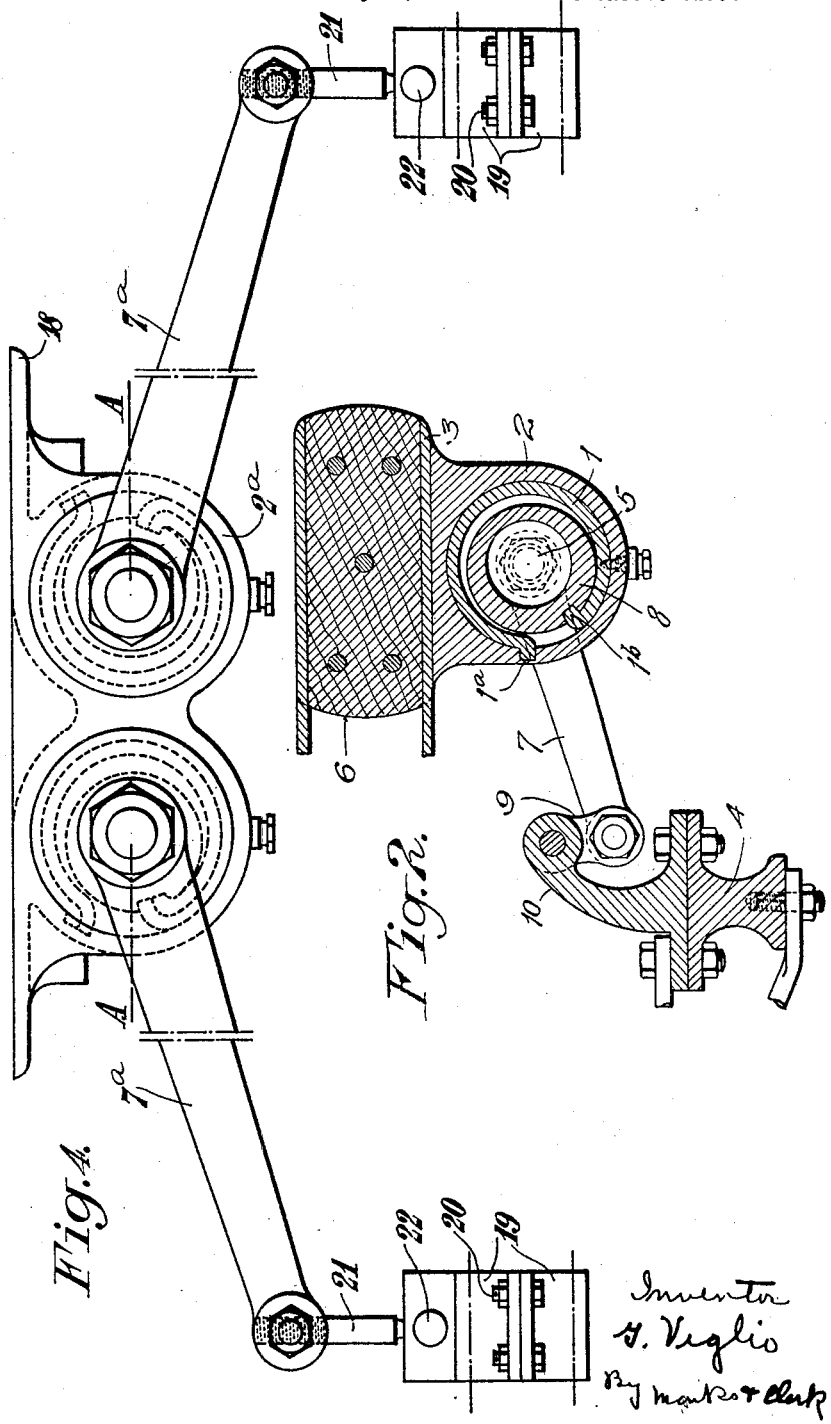
Inventor
G. Veglio
By Marks & Clerk
attys July 3, 1928.
G. VEGLIO
1,675,963
RESILIENT SUSPENSION FOR MOTOR VEHICLES
Filed July 27, 1925 3 Sheets-Sheet 3
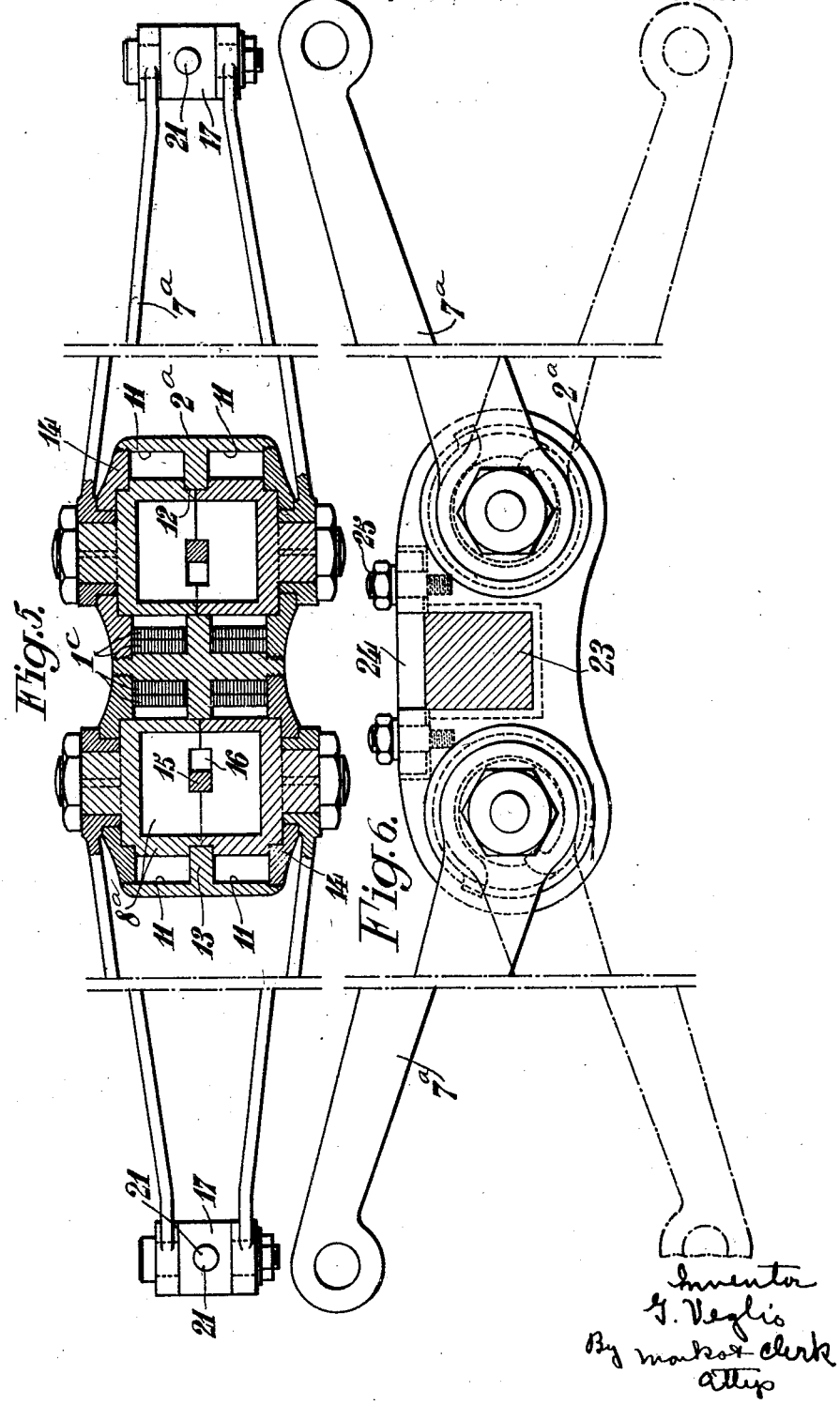
Inventor
G. Veglio
By Marks & Clerk
Attys Patented July 3, 1928.

1,675,963

UNITED STATES PATENT OFFICE.

GAETANO VEGLIO, OF LEVALLOIS-PERRET, FRANCE, ASSIGNOR TO SOCIETE ANONYME OVERCAU, OF PARIS, FRANCE, A FRENCH COMPANY.

RESILIENT SUSPENSION FOR MOTOR VEHICLES.

Application filed July 27, 1925, Serial No. 46,382, and in France August 8, 1924.

This invention relates to a suspension for vehicles and particularly for motor vehicles, essentially characterized in that the suspension springs are constituted by leaves or plates wound according to a portion of a spiral of less than 360 degrees and arranged within cylindrical casings, between the inner wall of the latter and the outer wall of barrels preferably out of center relatively to the said casings and angularly movable; one of the ends of each leaf or plate is secured to a casing and the other end is secured to a barrel and the direction of winding of the said leaf is such that, the casing being secured to the frame of a vehicle and the axis of the barrel being connected by a lever to an axle, when the distance between the frame and the axle diminishes, the spring-leaf is compressed and applies on the outer wall of the barrel according to a progressively increasing surface.

The accompanying drawing illustrates by way of example only various forms of construction of suspensions such as above characterized.

Figure 3:
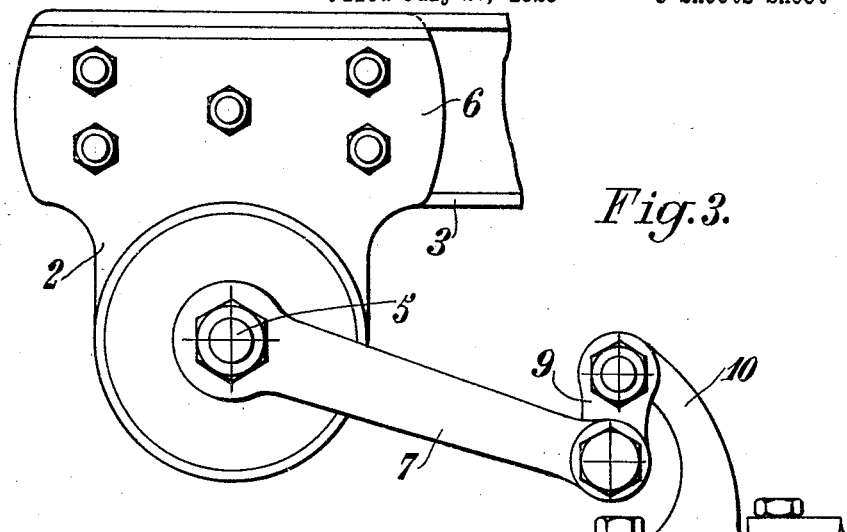
Figure 1:
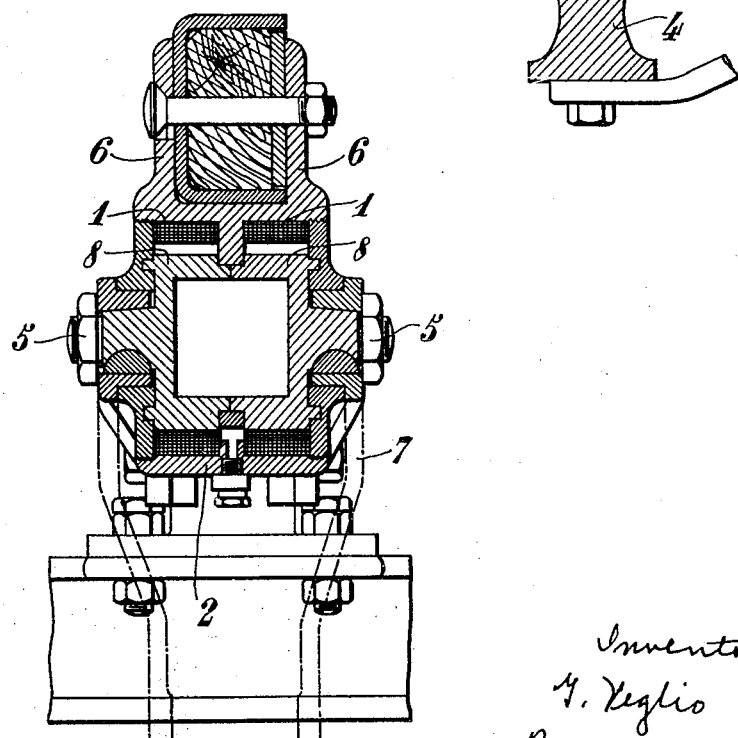

Figs. 1, 2, and 3 relate to a first form of construction. Fig. 1 shows in cross section an element of suspension interposed between a longitudinal bearer of a chassis and the corresponding end of an axle. Fig. 2 is a front view with corresponding vertical section. Fig. 3 is an external elevation.

Figs. 4 and 5 relate to another form of construction of suspension. Fig. 4 shows the suspension in elevation. Fig. 5 is a corresponding plan view with horizontal section according to line A—A of Fig. 4.

Fig. 6 is a view in elevation of another form of construction of suspension substantially similar to that shown in Figs. 4 and 5.

Whatever may be its form of construction, the suspension device forming the subject-matter of the invention essentially comprises at least a spring in the shape of a portion of spiral 1 of less than 360 degrees, one of the ends 1ª of which is secured on a casing 2 rigid with the frame 3 or with the axle 4, and the other end 1ᵇ is secured so as to follow the angular displacements of an axis 5 substantially arranged according to the polar axis of the spring 1 and parallel to the axle 4, the angular displacements of this axis 5 resulting from the variations of the vertical distance separating the axle 4 and the chassis 3.

In the example illustrated in Figs. 1, 2, and 3, the casing 2 is secured through one or more lugs 6 on the longitudinal bearer of the chassis and the axis 5, which transmits its angular displacements to one of the ends of the spring 1, is connected by a lever 7 to one of the ends of the axle 4. The spring 1 fits in a cylindrical cavity of the casing and one of its ends 1ª, in the shape of a heel piece, projects into a suitable groove of the casing 2. This spring 1, when at rest, fits against the side wall of the cavity provided in the casing and its movable end 1ᵇ, also curved in the shape of a heel piece, fits in the groove of a barrel 8 out of center relatively to the casing 2 and angularly rigid with the axis 5 journalled in a bearing portion of the casing 2. On each of the ends of this axis 5 are rigidly secured levers 7 pivoted, on the other hand, through the medium of double shackles 9 at the end of a fork member 10 secured to the axle 4 in any suitable manner.

Referring to Fig. 1, it will be seen that, if the axle 4 moves towards the chassis 5, the barrel 8 is angularly displaced in the direction of the arrow, thus tending to stress the spring 1 the distortions of which dampen the shock which has caused the axle and the chassis to move towards each other, in the same way as the leaf springs actually used.

The barrel 8 is suitably placed out of center relatively to the trunnions of the axis 5 so that the stressing of the spring 1 is effected without appreciable friction on the inner wall of the casing 2. But, when the spring relaxes for bringing back to its normal value the vertical distance separating the axle from the frame this relaxation first takes place nearly freely during a short angular displacement of the barrel 8, then is braked by friction of the spring 1 on the casing 2, so that the relaxation stroke of the spring terminates without sudden and violent spring relaxations. It will be clearly seen, by the simple examination of Fig. 1, that the small oscillations are practically braked in both directions. The invention thus realizes in a single apparatus, the resilient suspension combined both with a device damping the relaxations of appreciable amplitudes and with a friction damping device for the small oscillations.

The invention has just been described in its essential elements, but its principle can extend to varied forms of construction. In particular, it is possible to combine two barrels 8 (Fig. 1) placed in the same casing and angularly connected to the end of a spring 1, so that the stresses being distributed on two springs 1, the suspension is more flexible or supple.

In the forms of construction of a suspension shown in Figs. 4 and 5, on the one hand, and in Fig. 6, on the other hand, two casings $2^a$ are coupled in one and the same frame and a suspension element is realized by a resiliently distortable trapezium two theoretical apices of which are constituted by the free ends of levers $7^a$ rigidly secured on these barrels $8^a$.

In one and the same casing $2^a$ are provided two cylindrical cavities 11 laterally open and internally receiving barrels $8^a$ in two pieces which are joined together in the middle plane of a cylindrical bearing portion 12 provided in a middle rib 13 of each of the cavities of the casing $2^a$. The barrels $8^a$ are, on the other hand, supported and centered at their ends in the casing $2^a$, or in bosses of the latter, or by plugs 14 which laterally obturate the cavities 11. In the annular space comprised between each barrel $8^a$ and the adjacent wall of the cavity which encloses it are arranged the spring or springs $1^c$ which are engaged, as already indicated in the preceding examples, on the one hand, in a longitudinal groove of the barrel $8^a$, and, on the other hand, in a longitudinal groove provided in the wall of the casing $2^a$. Each barrel $8^a$ corresponds to two groups of two springs $1^c$, a pair of springs $1^c$ being arranged on each of the sides of a rib 13.

A radial finger 15 is provided on the cylindrical bearing portion presented by each rib 13 and, upon assemblage of the two members constituting a barrel $8^a$, is placed in an opening 16 of the latter. The length of this opening 16, in the circumferential direction, is so chosen that the finger 15 does not prevent the free play of the barrel $8^a$ up to the maximum amplitude of the possible distortions of the springs, but retains the said barrel when a fracture of the springs $1^c$ causes any resilient angular connection to cease between the barrel and the casing $2^a$. The collapsing of the chassis on an axle is thus avoided.

At each of the ends of the barrels $8^a$ is secured a lever $7^a$ combined with the corresponding lever by a cross member 17 capable of freely rotating in the heads or free ends of the said levers $7^a$.

In case the suspension element which has just been described is applied to an axle of a motor vehicle, the double casing $2^a$ is provided with a securing sole piece 18 on a cross-bar of the chassis, whilst each of the pairs of levers $7^a$ is connected to the axle near an end of the latter, by means of a suitable distortable joint. This joint can be realized, for instance as illustrated in Figs. 4 and 5. Two flanges 19 suitably connected by bolts 20 lock themselves on a suitable bearing portion of the axle, and a rod 21 screwed in a diametral screw threaded hole of the cross member 17 is pivoted on an axis 22 mounted on an upper flange 19.

This suspension element can moreover be used in combination with the known suspension springs interposed between the longitudinal bearers of the chassis and each of the ends of the axle, so as to act particularly as stabilizing device in the transverse direction of the chassis.

In the form of construction of Fig. 6, the double casing $2^a$ is recessed at its central portion so as to receive an axle 23 having an upper plate 24 suitably secured to the casing $2^a$ by studs 25 or other members. The free ends of each of the pairs of levers are connected by jointed connections, to the longitudinal bearer of the chassis which corresponds to the end of the axle on which the suspension element is mounted. As in the preceding example, such an element can ensure alone the suspension (for one of the sides of the vehicle at the place of an axle) or can be combined with a known suspension spring and act, in this case, particularly as device for stabilizing the relaxations of this known spring. It is obvious that the arrangement of Fig. 6 can be reversed the plate 24 being then arranged below the axle body.

These arrangements might even permit to do away with the axles, the axle arms of the wheels being then either carried by the ends of the arms $7^a$, or carried respectively by a casing $2^a$.

What I claim as my invention and desire to secure by Letters Patent is:—

1. In a suspension device for vehicles, a cylindrical casing adapted to be secured to the vehicle, a cylindrical barrel eccentrically disposed within said casing, a lever secured at one end to said barrel and connected at its other end to the axle of the vehicle, and an arcuate spring surrounding less than 360° of said barrel, said spring being secured at one end to said barrel and at its other end to said casing.

2. In a suspension device for vehicles, a cylindrical casing adapted to be secured to the vehicle, a cylindrical barrel having a diameter relatively smaller than the inner diameter of said casing and rotatably and eccentrically journalled in said casing, the axes of said barrel and casing being parallel, and an arcuate spring subtending an angle of less than 360° disposed between said barrel and casing, said spring being secured at one end to said barrel and at its other end to said casing.

In testimony whereof I have signed my name to this specification.

GAETANO VEGLIO.